United States Patent [19]

Gorman et al.

[11] Patent Number: 4,834,484
[45] Date of Patent: May 30, 1989

[54] OPTICAL FIBER COUPLER INCLUDING REFRACTIVE MEANS FOR PRODUCING AN ANNULAR BEAM

[75] Inventors: Michael A. Gorman; Mark H. Sterling; Robert M. Kiehn; Lowell T. Wood, all of Houston, Tex.

[73] Assignee: University of Houston-University Park, Houston, Tex.

[21] Appl. No.: 160,164

[22] Filed: Feb. 25, 1988

Related U.S. Application Data

[63] Continuation-in-part of Ser. No. 71,493, Jul. 9, 1987.

[51] Int. Cl.$^4$ .................. G02B 6/32; G02B 3/00; B29D 13/18
[52] U.S. Cl. ..................... 350/96.18; 350/96.10; 350/96.15; 350/96.20; 350/96.22; 350/432; 350/413; 350/436
[58] Field of Search ............ 350/96.10, 96.15, 96.16, 350/96.18, 96.20, 96.19, 96.21, 96.22, 96.31, 412, 413, 416, 432, 433, 434, 435, 436; 250/227

[56] References Cited

U.S. PATENT DOCUMENTS

| | | | |
|---|---|---|---|
| 1,202,223 | 10/1916 | Redfield | 350/409 X |
| 2,101,016 | 12/1937 | Beach | 88/57 |
| 2,405,989 | 8/1946 | Beach | 88/54 |
| 2,458,401 | 1/1949 | Moore | 177/327 |
| 3,419,321 | 12/1968 | Barber | 350/8 |
| 3,547,526 | 12/1970 | Devereux | 350/200 |
| 3,848,970 | 11/1974 | Goodell | 350/189 |
| 3,932,023 | 1/1976 | Humer | 350/96 |
| 3,937,557 | 2/1976 | Milton | 350/96.16 X |
| 3,980,391 | 9/1976 | Stewart | 350/96.18 X |
| 4,027,945 | 6/1977 | Iverson | 350/96.15 X |
| 4,099,848 | 7/1978 | Osakabe | 350/189 |
| 4,109,998 | 8/1978 | Iverson | 350/574 X |
| 4,128,302 | 12/1978 | DiVita | 350/96.18 |
| 4,181,439 | 1/1980 | Tresch | 356/338 |
| 4,476,519 | 10/1984 | Hayamizu | 350/96.18 X |
| 4,576,436 | 3/1986 | Daniel | 350/96.10 |
| 4,641,915 | 2/1987 | Asakawa | 350/96.18 |
| 4,753,501 | 6/1988 | Battle | 350/96.20 |
| 4,753,506 | 6/1988 | Einhorn et al. | 350/96.15 |
| 4,753,521 | 6/1988 | Deserno | 350/96.18 X |
| 4,799,751 | 1/1989 | Tekippe | 350/96.15 |

FOREIGN PATENT DOCUMENTS

| | | | |
|---|---|---|---|
| 0111390 | 6/1984 | European Pat. Off. | 350/96.16 X |
| 61-230107 | 10/1986 | Japan | 350/96.16 X |

OTHER PUBLICATIONS

Speer et al., "The Diversity of Fiber Optic Rotary Connectors (Slip Rings)", SPIE vol. 839, Components for Fiber Optic Applications II (1987) pp. 122–128.
J. B. Goodell, Eccentric Lenses for Producing Ring Images, Dec. 1969, p. 2566, Applied Optics.
John H. McCleod, The Axicon: A New Type of Optical Element, submitted Sep. 10, 1953, p. 592, Journal of Optical Society of America.
M. V. Berry, The Shadows of Floating Objects and Dissipating Vortices, 1983, vol. 30, No. 1, 23–40, Optica Acta.

Primary Examiner—William L. Sikes
Assistant Examiner—Brian M. Healy
Attorney, Agent, or Firm—Pravel, Gambrell, Hewitt, Kimball & Krieger

[57] ABSTRACT

A cuspate lens is disclosed having a slope magnitude which decreases from a maximum at a central cusp to a minimum at the periphery. A radially symmetric version of the lens can focus light into a ring, or produce an annular beam. Also disclosed are a fiber optic coupler and an optical slip ring using the cuspated lenses or other refractive devices capable of producing an annular beam of light, such as axicons or eccentric lenses.

12 Claims, 4 Drawing Sheets

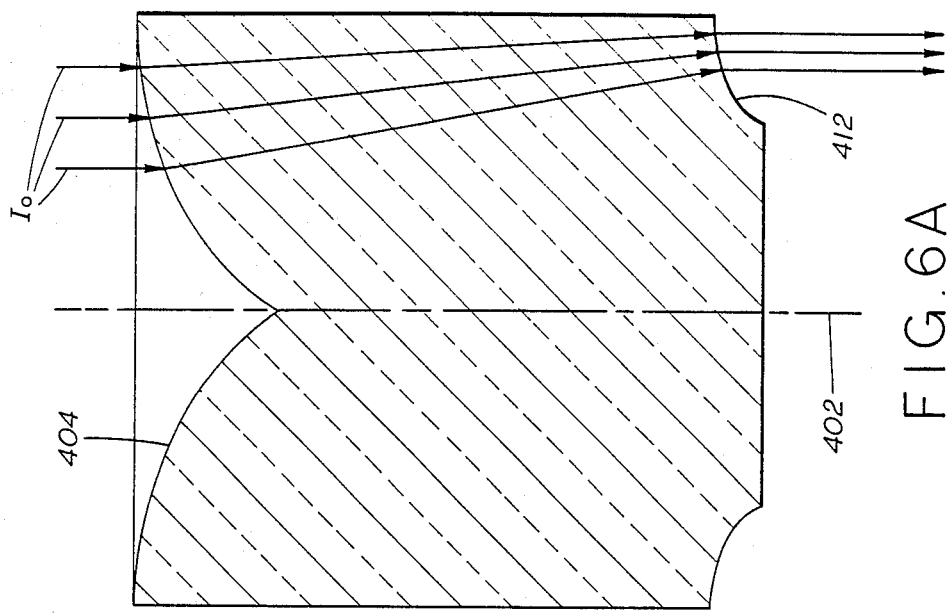
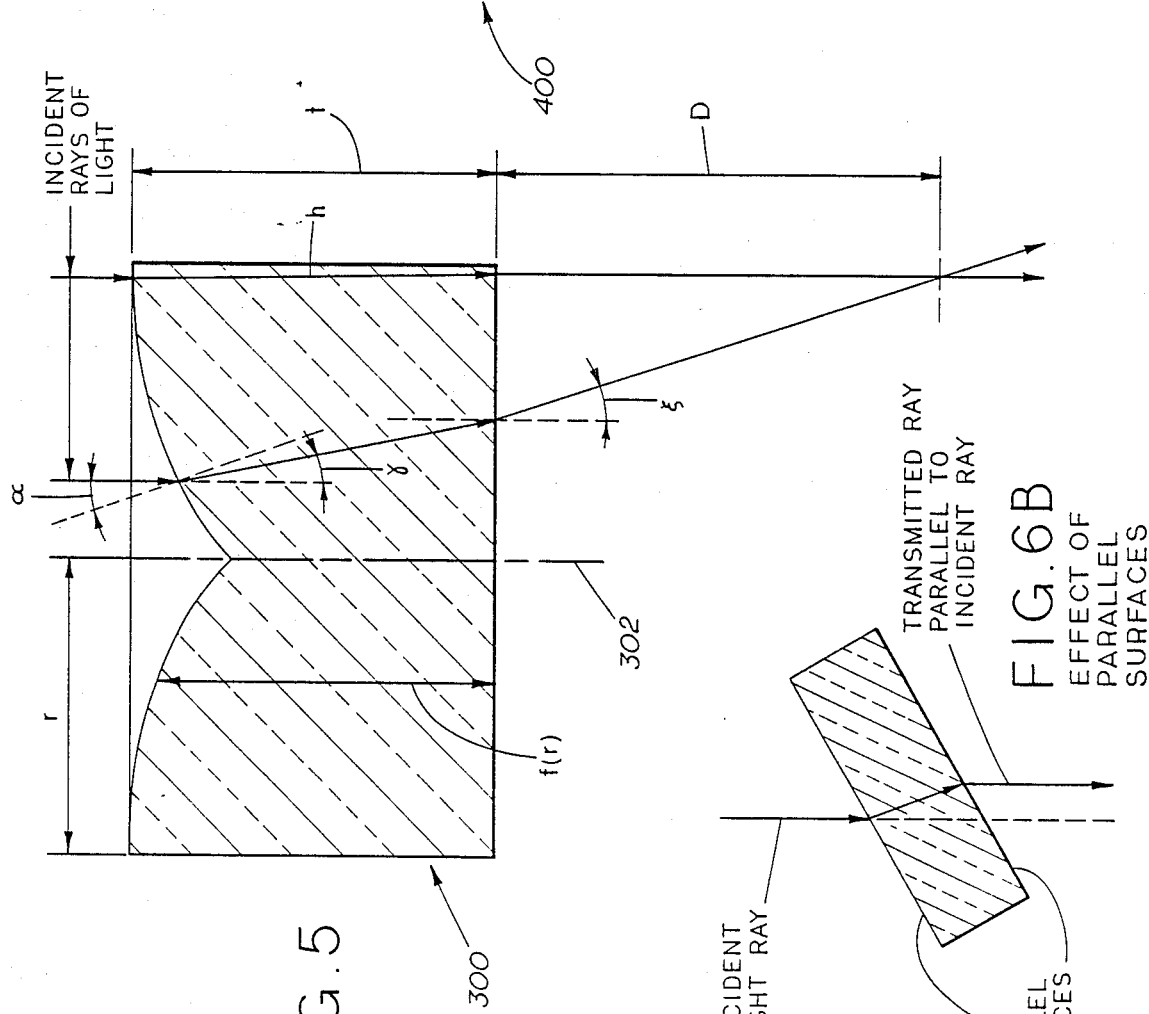
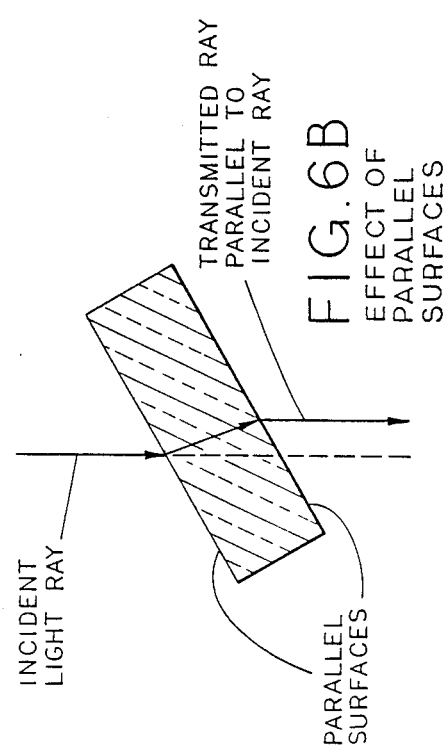

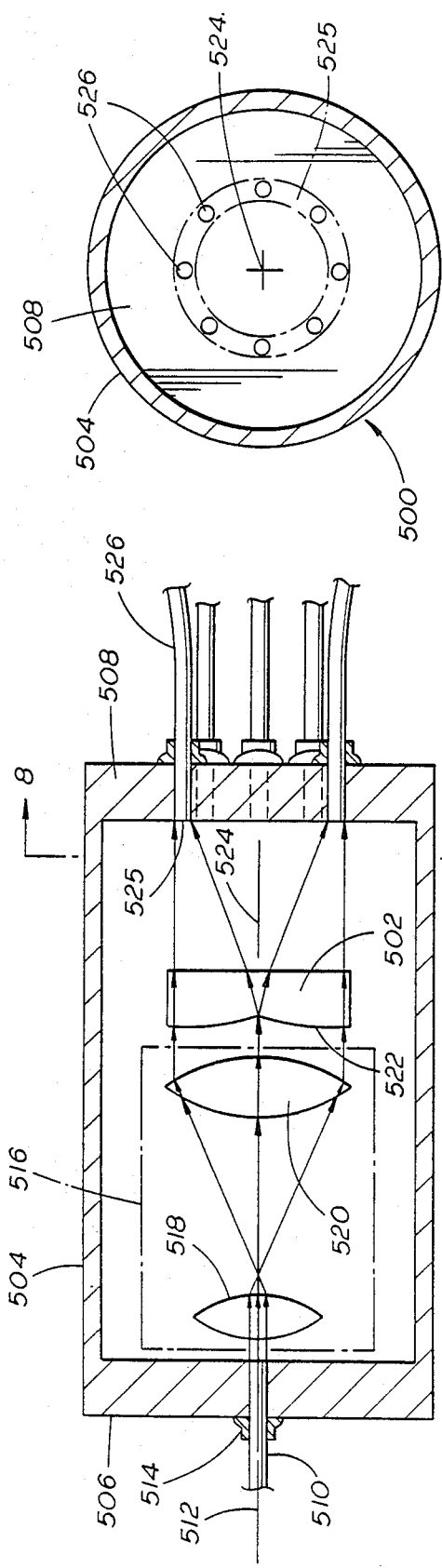
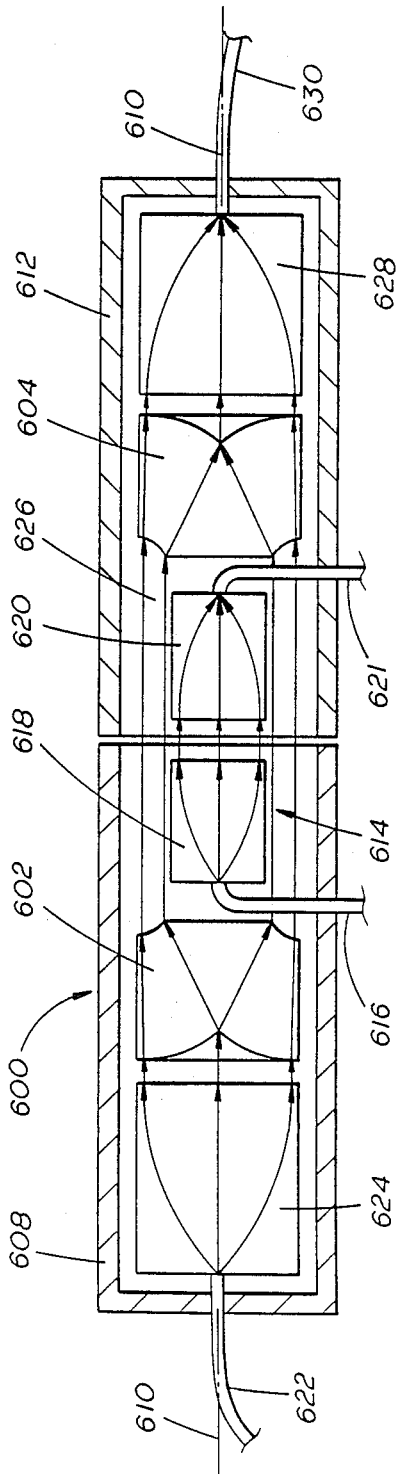

OPTICAL FIBER COUPLER INCLUDING REFRACTIVE MEANS FOR PRODUCING AN ANNULAR BEAM

The invention described herein was made in the course of, or under a contract with the Office of Naval Research, and the Government has certain rights in the invention.

This is a continuation-in-part application based on application Ser. No. 071,493 filed July 9, 1987, now pending.

FIELD OF THE INVENTION

This invention relates to an optical coupler using a cuspate refractive device having a maximum slope magnitude inside the periphery of the device which decreases toward the periphery, and particularly to a cuspate lens which focuses radiation into a ring or which produces an annular beam of parallel radiation. The coupler might also use an axicon or an eccentric lens capable of focusing radiation into a ring or producing an annular beam of light. The invention specifically relates to a fiber optic coupler and an optical slip ring employing such a cuspate lens or axicon or eccentric lens.

BACKGROUND OF THE INVENTION

Couplers for optical fibers in which light is transmitted between one optical fiber and one or more other optical fibers are well known. However, such optic couplers heretofore known have suffered from a drawback in that it has been necessary to fuse the fibers together. Once the fibers are fused, it is difficult to take them apart. Also, it has been difficult to ensure that each fiber receives the same fraction of the incident light. Thus, there is a need for an optical coupler in which it is not necessary to fuse the optical fibers and in which each fiber receives the same fraction of incident light.

SUMMARY OF THE INVENTION

The present invention provides an optical fiber coupler including means for receiving a transmissive end of a first optical fiber, means for receiving transmissive ends of a plurality of second optical fibers in a circular arrangement and defining a ring with a radial width corresponding to a transverse dimension of the second optical fibers, and means including a cuspate lens or axicon or eccentric lens for conservatively transmitting light between the end of the first optical fiber and the ring.

The principles of the invention are also useful in an optical slip ring having at least two channels. The slip ring includes first and second opposed housings rotatable with respect to each other about a common axis. A first channel includes a first channel optical fiber and first channel beam spreader transmissively associated therewith in each housing. The first channel beam spreaders are coaxially aligned with the axis and transmissively opposed in the respective housings. A second channel includes a second channel optical fiber, and a second channel beam spreader and a cuspate lens, axicon or eccentric lens, transmissively associated therewith in each respective housing. The second channel beam spreaders are coaxially aligned with the axis and transmissively disposed between a respective second channel optical fiber and a respective cuspate lens, axicon or eccentric lens. Each device has a front surface for receiving light from a respective second channel beam spreader and a rear surface for transmitting the received light into an annular beam around the first channel beam spreaders. The rear surfaces of the cuspate lenses, axicons or eccentric lenses, as the case may be, are transmissively opposed in their respective housings.

BRIEF DESCRIPTION OF THE DRAWINGS

FIG. 5 is a schematic cross-sectional view of the lens of FIG. 3 illustrating variables in the optical path length equation;

FIG. 6 is a schematic cross-sectional view of the lens of FIG. 4 illustrating a theoretical model for calculation of the lens surface profiles;

FIG. 7 is a schematic cross-sectional view of a fiber optic coupler of the present invention using a cuspate lens;

FIG. 8 is a plan view of the device of FIG. 7 as seen along the lines 8—8; and

FIG. 9 is a schematic cross-sectional view of a two-channel optic slip ring of the present invention using a cuspate lens.

DETAILED DESCRIPTION OF THE INVENTION

Figure 2:
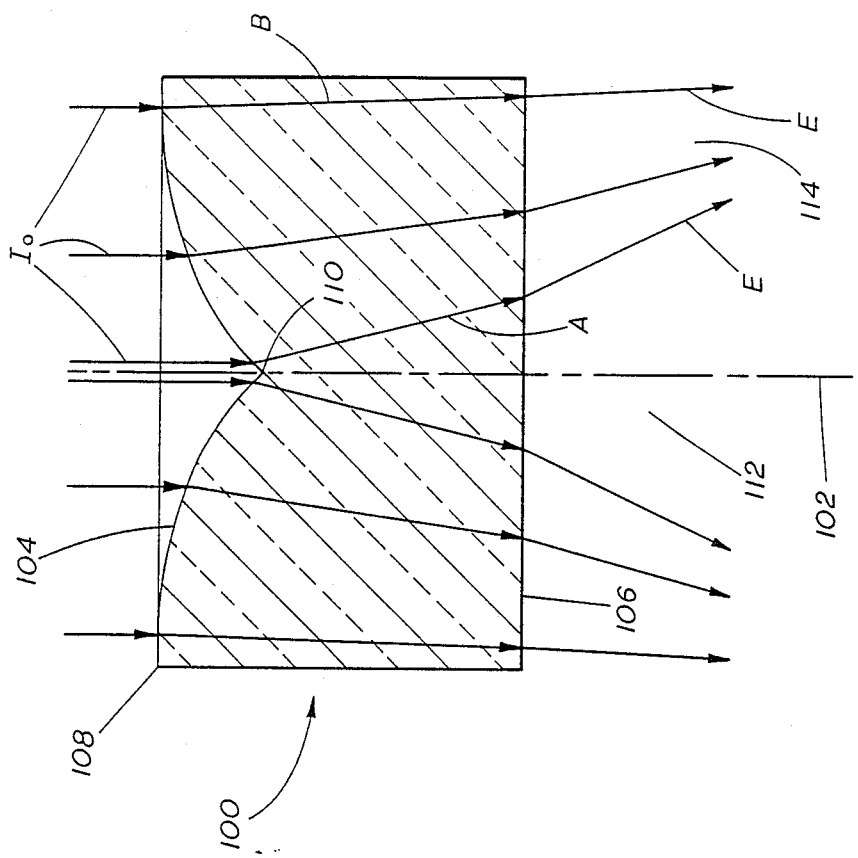
FIG. 2 is a schematic view, partly in cross-section, of the lens of FIG. 1 receiving light from a parallel light source as seen along the lines 2—2.

The coupler of the present invention is contemplated as being useful for the transmission of one or more types of radiation, such as, for example, gamma rays, X-rays, ultraviolet rays, visible light rays, infrared, microwaves, radio waves, sound and ultrasound waves, and the like. As used herein, the term "radiation" also broadly includes beams of particles, such as, for example, electrons, protons, neutrons, alpha particles and the like. The refractive device used is generally made of a material transmissive to the type of radiation desired to be transmitted therethrough. Such materials are known in the art. For convenience, reference is made herein to light and visible light rays for exemplary purposes, but it is to be understood that the refractive device may be suitable for other types of radiation as well, depending on the materials of construction.

As used herein, the term "slope magnitude" is the absolute value of the slope of a lens surface, e.g. the variation of the lens surface dimension taken in a direction parallel to a reference axis or plane with respect to the variation in dimension in a direction normal to the reference. Thus, conventional concave and convex lens surfaces have a slope magnitude of zero at the center which increases to a maximum slope magnitude at their periphery. In contrast, the front surface of the cuspate lens has a maximum slope magnitude inside the area bounded by the periphery, preferably adjacent the cusp, and especially at the cusp, and a slope magnitude which decreases in a direction from the cusp toward the periphery for at least a portion of the distance from the cusp toward the periphery, preferably to a minimum slope magnitude at the periphery, and especially decreasing essentially over the entire distance from the cusp to the periphery. In the eccentric lens, the slope magnitude decreases in a direction from the cusp toward a point half way to the periphery, at which point the slope is zero. The slope magnitude then increases in a direction from this point of zero slope toward the periphery, where the slope magnitude is again at a maximum. An example of an axicon is a circular toric lens having on its rear surface an annular protruding ring which refracts light toward the axis of the lens.

As used herein, the term "cusp" is used in the sense of a fixed point on a mathematical curve at which a point tracing the curve would essentially reverse its direction of motion, i.e. the sign of the slope changes and is discontinuous at the cusp. The cusp of the front surface of the refractive device is located at least at the longitudinal axis of the device. The cusp may be, for example, a point at the center of a radially symmetric, circular lens, or at the center of an elliptically shaped lens. Alternatively, the cusp may be a straight line in a lens symmetric with respect to a plane passing through the line, or a curve in an asymmetric refractive device.

Preferably, the refractive device is symmetric. For example, the lens may be radially symmetric with respect to the cusp to generally focus light away from the axis passing through the cusp into a ring at a focal plane around a darkened central area. Or, the lens may have an elliptical periphery and be symmetric with respect to a plane containing the axially aligned cusp to generally focus light at a focal plane, away from an elliptical area into an elliptical ring around the darkened elliptical central area. Alternatively, the device may have a front surface with a linear cusp extending from one peripheral side to an opposite peripheral side and be symmetric with respect to the cusp to focus incident radiation at a focal plane into two parallel lines away from the area between the parallel lines.

In a preferred embodiment, essentially all of the parallel incident light entering the front surface of the refractive device is transmitted through the rear surface. Thus, in contrast to other optical devices in which light is excluded from a central region by blocking transmission with an opaque surface or material, the refractive device used in the present invention conserves the incident light and focuses or refracts essentially all of the light to the periphery of the area from which the transmitted light is excluded.

Figure 1:
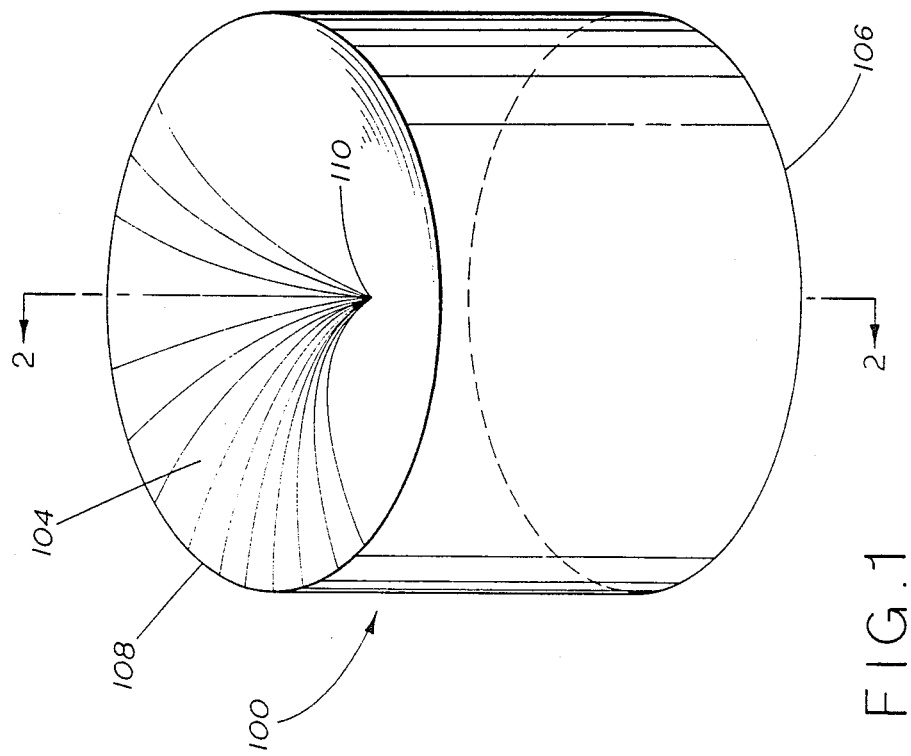
FIG. 1 is a perspective view of a cuspate lens.

Referring now to FIGS. 1 and 2, there is shown a refractive device or lens 100 made by conventional lens manufacturing techniques such as lathing or molding of an optically transmissive material such as, for example, glass, polymethylmethacrylate or the like. The lens 100 has a central longitudinal axis 102, front surface 104, and rear surface 106. The front surface 104 extends laterally from axis 102 toward periphery 108 and is radially symmetric with respect to axis 102. The surface 104 has a cusp 110 at axis 102. The slope magnitude is greatest at the cusp 110 and decreases from the cusp 110 to a minimum at the periphery 108.

In operation, the lens 100 receives incident light $I_0$ oriented parallel with respect to axis 102. The light $I_0$ is bent or refracted at the front surface 104. The path through lens 100 of the light $I_0$ refracted at surface 104 depends on the angle of the surface 104 through which the light $I_0$ is received and the refractive index of the lens material. However, the decreasing slope magnitude of the surface 104 generally refracts the light $I_0$ away from the axis 102. For example, path A followed by the light $I_0$ received at the surface 104 adjacent the cusp 110 is bent more sharply away from the axis 102 than the light $I_0$ received at the surface 104 adjacent the periphery 108 which follows a path B substantially parallel to axis 102. The result is that the light E transmitted through the surface 106 is generally refracted away from the axis 102 producing a darkened central circle 112 from which the light E is generally excluded and a generally bright ring 114. The lens 100 may or may not have a focal plane, depending on the geometry of the front surface 104, the refractive properties of the material of which the lens 100 is made, and the geometry of rear surface 106.

Figure 3:
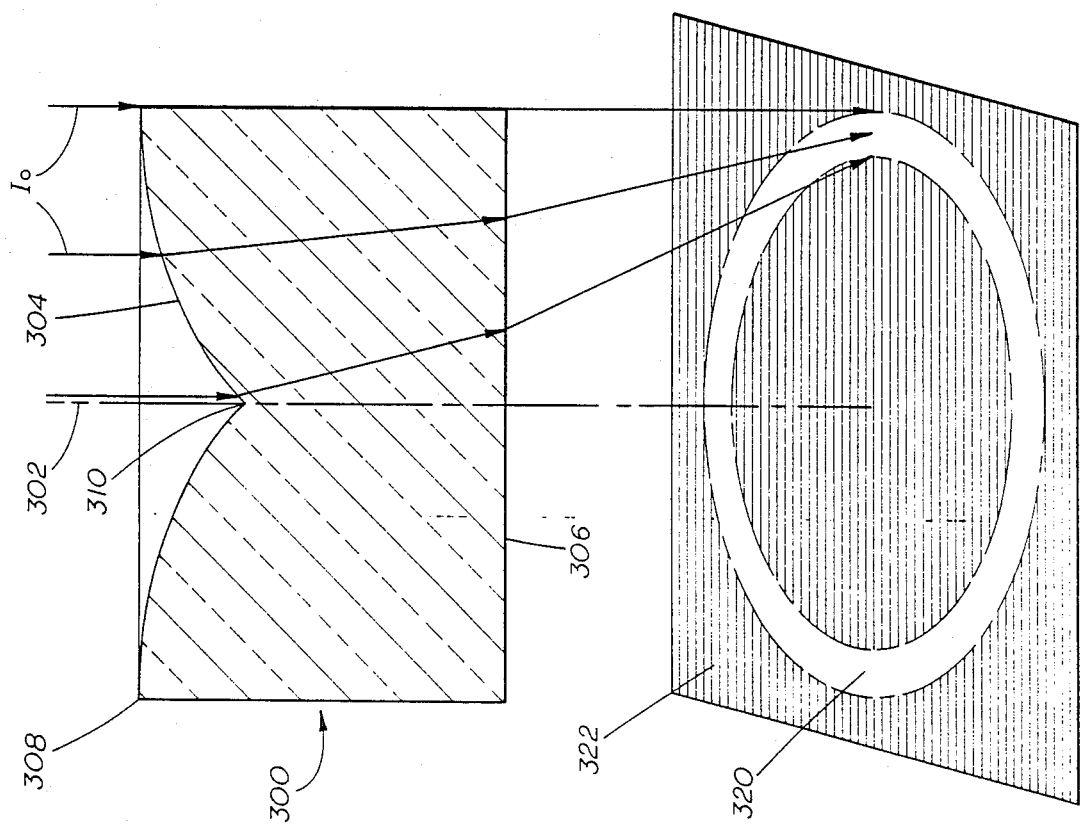
FIG. 3 is a schematic view, partly in cross-section, of a radially symmetric lens with an annular focal plane.

In FIG. 3, there is illustrated a radially symmetric lens 300 having an axis 302, front surface 304, rear surface 306, periphery 308 and cusp 310 essentially as described above with reference to FIGS. 1 and 2. However, taking into account the refractive index of material of lens 300 and the flat geometry of the rear surface 306, the geometry of surface 304 is designed to focus the incident light $I_0$ into ring or annulus 320 at focal plane 322. By altering the geometry of surface 304, the focal plane 322 may be axially disposed as desired.

Generation of a surface profile for the front surface of a radially symmetric cuspate lens with an annular focal plane, such as the lens illustrated in FIG. 3, is done by solving the optical path length equation therefor:

$$OPL = [t - f(r)] + n[f(r)/\cos \gamma] + [D/\cos \xi] \tag{1}$$

wherein, as illustrated in FIG. 5, OPL is the optical path length, t is the thickness of the lens at the periphery, f(r) is the functional form of the surface, n is the refractive index, $\gamma$ is the angle of the path of the ray inside the lens to the lens axis, and $\xi$ is the angle of the transmitted light to the normal of the rear surface. Since $\alpha = \tan^{-1}[f'(r)]$, wherein $f'(r) = df/dr$ and $\alpha$ is the angle between the incident ray and the normal to the lens surface, it can be shown that $$\gamma = \tan^{-1}[f'(r)] - \sin^{-1}\{[\sin(\tan^{-1}[f'(r)])]/n\}; \tag{2}$$

and $$\xi = \sin^{-1}(n \sin \gamma). \tag{3}$$

By rearranging equation (1),

By rearranging equation (1), $$f(r) = [OPL - t - D\sec\xi]/[n\sec\gamma - 1]. \tag{4}$$

Equation (4) is difficult to solve mathematically, but its solution can be approximated by numerical methods. An exemplary Fortran computer program for numerically solving equation (4) is as follows:

```
         PROGRAM CUSP1

REAL R, DR, F, FP, LF, FF, CF, CF1, ETA, GAMMA, N, T, D
         REAL Q, RR, RRR, RAD
         WRITE (6,10)
10       FORMAT (1X, 'RADIUS(mm)=')
```

```
          READ (5,20) R
20        FORMAT (F15.7)
          WRITE (6,11)
11        FORMAT (1X, 'STEPSIDE(mm)=')
          READ (5,20) DR
          WRITE (6,12)
12        FORMAT (1X, 'THICKNESS(mm)=')
          READ (5,20) T
          WRITE (6,13)
13        FORMAT (1X, 'FOCAL DISTANCE(mm)=')
          READ (5,20) D
          WRITE (6,14)
14        FORMAT (1X,'n=')
          READ (5,20) N
          RAD=R
          RR=0
          FP=0
          F=T
          RRR=RR+RAD
          WRITE (6,15)
15        FORMAT (1X, '(Coordinates of surface profile referenced to')
          WRITE (6,10)
16        FORMAT (1X, 'an origin on the lens axis at the rear surface.)')
          Q=T-F
          WRITE (6,17)
17        FORMAT (1X, '      r(mm)       f(r)     (mm)')
          WRITE (6,100) RRR, F
100       FORMAT (F20.2,F13.2)F13.4,F13.4)
          R=R-DR
          RR=RR-DR
          F=F-FP*DR
          LF=F
          Q=T-LF
150       RRR=RR+RAD
          WRITE (6,100) RRR, LF
          R=R-DR
          RR=RR-DR
          FF=LF
          F=LF
          LF=F
          Q=T-LF
          FP=FP+.0001
          F=FF-FP*DR
          GAMMA=ATAN(FP)-ASIN(SIN(ATAN(FP))/N)
          ETA=ASIN(N*SIN(GAMMA))
          CF=(N-1.)*T+(1.-1./COS(ETA))*D
          CF1=CF/((N/COS(GAMMA))-1.)
          IF (CF1-F-.00001) 300,300,200
300       IF (R) 400,150,150
400       END
```

Using this CUSP1 PROGRAM, the following data output was generated:

RADIUS(mm)=20.
STEPSIZE(mm)=0.5
THICKNESS(mm)=25.
FOCAL DISTANCE(mm)=50.
n=1.49

(Coordinates of surface profile referenced to an origin on the lens surface at the rear axis.)

| r (mm) | f(r) (mm) |
|---|---|
| 20.00 | 25.00 |
| 19.50 | 25.00 |
| 19.00 | 24.98 |
| 18.50 | 24.96 |

(Coordinates of surface profile referenced to an origin on the lens surface at the rear axis.)

| r (mm) | f(r) (mm) |
|---|---|
| 18.00 | 24.93 |
| 17.50 | 24.88 |
| 17.00 | 24.83 |
| 16.50 | 24.78 |
| 16.00 | 24.71 |
| 15.50 | 24.63 |
| 15.00 | 24.55 |
| 14.50 | 24.46 |
| 14.00 | 24.36 |
| 13.50 | 24.25 |
| 13.00 | 24.14 |
| 12.50 | 24.01 |
| 12.00 | 23.88 |
| 11.50 | 23.74 |
| 11.00 | 23.59 |
| 10.50 | 23.43 |
| 10.00 | 23.27 |
| 9.50 | 23.09 |
| 9.00 | 22.91 |
| 8.50 | 22.72 |
| 8.00 | 22.52 |
| 7.50 | 22.31 |
| 7.00 | 22.09 |
| 6.50 | 21.87 |
| 6.00 | 21.63 |
| 5.50 | 21.39 |
| 5.00 | 21.13 |
| 4.50 | 20.87 |
| 4.00 | 20.60 |
| 3.50 | 20.32 |
| 3.00 | 20.03 |
| 2.50 | 19.73 |
| 2.00 | 19.42 |
| 1.50 | 19.10 |
| 1.00 | 18.77 |
| 0.50 | 18.43 |
| 0.00 | 18.08 |

A cuspate lens was fabricated by machining a polymethacrylate block obtained under the trade designation PLEXIGLAS by a computer-aided lathing process to conform to the profile generated by this program. The resulting lens had a radius of 20 mm, a thickness of 25 mm, a focal distance of 50 mm from the rear surface and a focusing ring width of about 1 mm.

Figure 4:
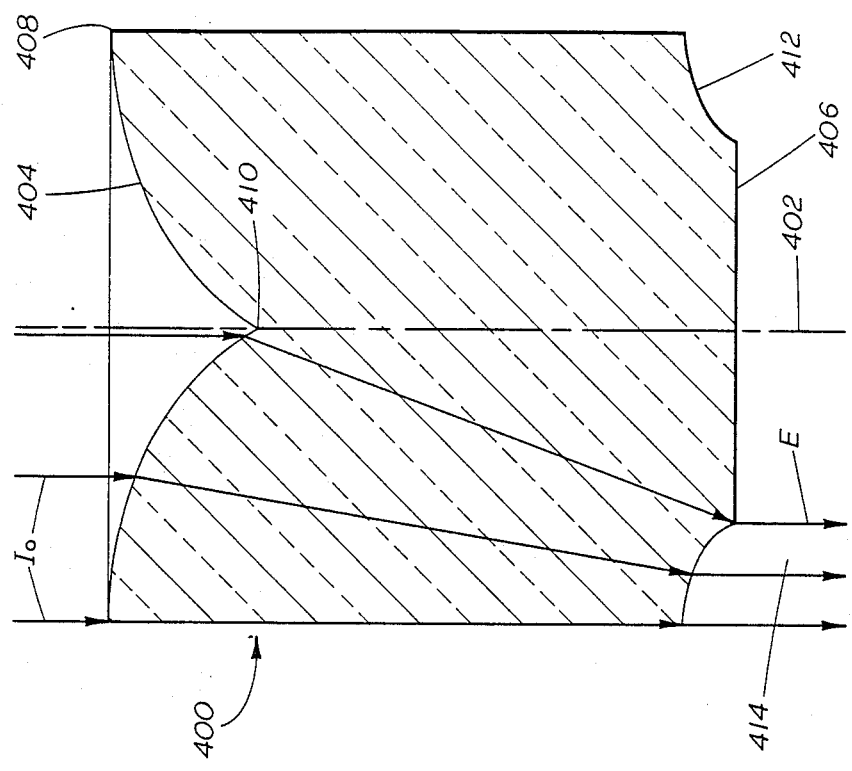
FIG. 4 is a schematic cross-sectional view of a radially symmetric lens producing an annular beam.

Referring to FIG. 4, the radially symmetric cuspate lens 400 has an axis 402, front surface 404, rear surface 406, periphery 408 and cusp 410 essentially as described above with reference to FIG. 3. However, the front surface 404 has a geometry such that the incident light $I_0$ is refracted to an annular section 412 of the rear surface 406. The annular section 412 has a slope geometrically similar to that of the front surface 404 so that the light E is emitted therefrom oriented in the same direction as the incident light $I_0$, i.e. parallel to axis 402. Thus, the lens 400 produces an annular beam 414.

A Fortran computer program based on geometric ray tracing equations as illustrated in FIG. 6 for the radially symmetric cuspate lens 400 of FIG. 4 producing an annular beam is as follows:

```
      PROGRAM ANNULAR

REAL T, N, DR, R, W, GAMMA, FR, FPR, TP, RP
      REAL FPRL, RPL, TPL, RAD, OCR, OCFR, OCTP, OCRP, OTP
      WRITE (6,10)
10    FORMAT (1X,'RADIUS(mm)=')
      READ (5,20) RAD
20    FORMAT (F15.7)
      WRITE (6,11)
11    FORMAT (1X,'STEPSIZE(mm)=')
      READ (5,20) DR
      WRITE (6,12)
12    FORMAT (1X,'THICKNESS OF LENS(mm)=')
      READ (5,20) T
      WRITE (6,13)
13    FORMAT (1X,'APPROXIMATE RING THICKNESS(mm)=')
      READ (5,20) W
      WRITE (6,14)
14    FORMAT (1X,'n=')
      READ (5,20) N
      WRITE (6,15)
15    FORMAT (1X,'ORIGIN CORRECTION (mm)=')
      READ (5,20) OTP
      R=0
      FRP=0
      RP=0
      RP=0
      TP=0
      WRITE (6,16)
16    FORMAT (1X,'(Coordinates of surface profiles referenced to')
      WRITE (6,17)
17    FORMAT (1X, 'an origin on the lens axis at the rear surface.)')
```

```
              WRITE (6,18)
18            FORMAT (1X,'                    ')
              WRITE (6,19)
19            FORMAT (1X,'    FRONT SURFACE      SLOPE      REAR SURFACE')
              WRITE 6,21
21            FORMAT (1X,'   r (mm)     f(r) (mm)          r (mm)    g(r) (mm)')
              OCR=R+RAD
              OCT=T+OTP
              OCRP=RP+RAD
              OCTP=TP+OTP
              WRITE (6,100) OCR, OCT, FRP, OCRP, OCTP
100           FORMAT (F13.2,F13.2,F13.2,F13.2,F13.2)
              R=-DR
              TPL=0
              RPL=0
              FPRL=0
200           FR=(((T+W)/2)**2-R**2)**.5+((T-W)/2)
              FPR=-R/((((T+W)/2)**2-R**2)**.5)
              GAMMA=ATAN(FPR)-ASIN(SIN(ATAN(FPR))/N)
              RP=(R+(FR+FPRL*RPL-TPL)*TAN(GAMMA))/(1+FPRL*TAN(GAMMA))
              TP=TPL-FPRL*(RPL-RP)
              OCR=R+RAD
              OCFR=FR+OTP
              OCRP=RP+RAD
              OCTP=TP+OTP
              WRITE (6,100) OCR, OCFR, FPR, OCRP, OCTP
              RLP=RP
              TPL=TP
              FPRL=FPR
              R=R-DR
              IF (R+RAD) 500,200,200
500           END
```

Using this PROGRAM ANNULAR, the following data output was generated:

ANNULAR

RADIUS(mm)=20.
STEPSIZE(mm)=.5
THICKNESS OF LENS(mm)=40.
APPROXIMATE RING THICKNESS(mm)=10.
n=1.49
ORIGIN CORRECTION(mm)=3.00

(Coordinates of surface profile referenced to an origin on the lens surface at the rear axis.)

| FRONT SURFACE | | | REAR SURFACE | |
|---|---|---|---|---|
| r (mm) | f(r) (mm) | SLOPE | r (mm) | g(r) (mm) |
| 20.00 | 43.00 | 0.00 | 20.00 | 3.00 |
| 19.50 | 42.99 | 0.02 | 19.76 | 3.00 |
| 19.00 | 42.98 | 0.04 | 19.53 | 3.00 |
| 18.50 | 42.95 | 0.06 | 19.29 | 2.99 |
| 18.00 | 42.92 | 0.08 | 19.05 | 2.97 |
| 17.97 | 42.87 | 0.10 | 18.82 | 2.95 |
| 17.00 | 42.82 | 0.12 | 18.58 | 2.93 |
| 16.50 | 42.75 | 0.14 | 18.35 | 2.90 |
| 16.00 | 42.68 | 0.16 | 18.12 | 2.87 |
| 15.50 | 42.59 | 0.18 | 17.88 | 2.83 |
| 15.00 | 42.49 | 0.20 | 17.65 | 2.79 |
| 14.50 | 42.39 | 0.23 | 17.42 | 2.74 |
| 14.00 | 42.27 | 0.25 | 17.20 | 2.69 |
| 13.50 | 42.14 | 0.27 | 16.97 | 2.63 |
| 13.00 | 42.00 | 0.29 | 16.75 | 2.57 |
| 12.50 | 41.85 | 0.31 | 16.53 | 2.51 |
| 12.00 | 41.69 | 0.34 | 16.31 | 2.44 |
| 11.50 | 41.51 | 0.36 | 16.09 | 2.37 |
| 11.00 | 41.32 | 0.39 | 15.87 | 2.29 |
| 10.50 | 41.12 | 0.41 | 15.66 | 2.21 |
| 10.00 | 40.91 | 0.44 | 15.46 | 2.12 |
| 9.50 | 40.69 | 0.46 | 15.25 | 2.03 |
| 9.00 | 40.45 | 0.49 | 15.05 | 1.94 |
| 8.50 | 40.20 | 0.52 | 14.85 | 1.84 |
| 8.00 | 39.93 | 0.55 | 14.66 | 1.74 |
| 7.50 | 39.65 | 0.58 | 14.47 | 1.64 |
| 7.00 | 39.35 | 0.61 | 14.29 | 1.53 |
| 6.50 | 39.04 | 0.64 | 14.11 | 1.43 |
| 6.00 | 38.71 | 0.68 | 13.94 | 1.31 |
| 5.50 | 38.37 | 0.71 | 13.77 | 1.20 |
| 5.00 | 38.00 | 0.75 | 13.61 | 1.09 |
| 4.50 | 37.62 | 0.79 | 13.45 | 0.97 |
| 4.00 | 37.21 | 0.83 | 13.30 | 0.85 |
| 3.50 | 36.78 | 0.88 | 13.16 | 0.74 |
| 3.00 | 36.33 | 0.93 | 13.03 | 0.62 |
| 2.50 | 35.85 | 0.98 | 12.91 | 0.51 |
| 2.00 | 35.35 | 1.04 | 12.79 | 0.39 |
| 1.50 | 34.82 | 1.10 | 12.69 | 0.28 |
| 1.00 | 34.25 | 1.17 | 12.59 | 0.18 |
| 0.50 | 33.64 | 1.25 | 12.51 | 0.08 |
| 0.00 | 33.00 | 1.33 | 12.44 | 0.00 |

A cuspate lens producing an annular beam is fabricated by machining a polymethacrylate block to conform to this profile. The resulting lens has a radius of 20 mm, a thickness of 40 mm and produces an annular beam with an inside radius of about 12.4 mm and an outside radius of 20 mm.

The cuspate lens producing an annular beam is useful in the fiber optic coupler and in the optical slip ring of the present invention.

Referring now to FIGS. 7 and 8, there is seen a fiber optic coupler 500 employing a cuspate lens 502. The eccentric lens or axicon can similarly be used without departing from the concept of the present invention. The coupler 500 has a housing 504 with a first fiber optic receiving end 506 and a second fiber optic receiving end 508. A source fiber optic 510 is received along a central longitudinal axis 512 in a conventional fiber optic receiver 514. A beam spreader 516 is positioned to spread light emitted by the fiber optic 510 into a parallel oriented beam of generally circular cross-section. As shown, the beam spreader 516 comprises first biconvex lens 518 and second biconvex lens 520 coaxially positioned in spaced relation thereto. Alternatively, the beam spreader 516 could be a rod device with a refractive index gradient such as that available from Melles Griot. The lens 502 is disposed in the device 500 to receive a beam of light from the beam spreader 516 at the front surface 522 such that the beam is coaxial with a central longitudinal axis 524 of the lens 502. The lens 502 is designed to focus light into a ring or annulus 525 on second fiber optic receiving end 508 in which a plurality of second fiber optics 526 are received.

In operation, the fiber optic coupler 500 receives an optical signal via the fiber optic 510 which is enlarged in the beam spreader 516. The beam from the beam spreader 516 is received by the cuspate lens 502 and focused to the ring 525 where the light is received by each of the optical fibers 526 and transmitted thereby. In this manner, each fiber 526 receives the same fraction of incident light. Conversely, light signals can be transmitted from the fibers 526 to the fiber 510 via the same mechanism.

It is important that each of the transmissive ends of the optical fibers 510 and 526 be cut at a right angle as is well known in the art. However, any number of the second optical fibers can be employed, up to the number which the endplate 508 is designed to receive. The optical fibers 510 and 526 can be readily removed and/or inserted in the respective receiving ends 506 and 508 since they are mechanically attached rather than welded.

If desired, the device 500 can also be used as an optic slip ring by, for example, permitting the end 508 to rotate with respect to the housing 504. In this embodiment, the end 508 is positioned on a stationary platform and the housing 504 on a platform rotating with respect thereto about the axes 512 and 524, or vice versa.

Referring now to FIG. 9, there is seen a two-channel optic slip ring 600 employing cuspate lenses 602 and 604. Eccentric lenses or axicons could also be used. The slip ring 600 has a first housing 608 positioned on a rotating platform (not shown) rotating around an axis 610, and a second housing 612 positioned on a stationary or rotating platform (not shown) such that the housings 608 and 612 rotate with respect to each other. In a first channel 614, a fiber optic 616 is positioned to transmit light to and/or receive light from a beam spreader 618 coaxial with the axis 610. A corresponding coaxial beam spreader 620 is positioned to receive light emitted from and/or transmit light to beam spreader 618, and which is transmissively connected to optical fiber 621. The beam spreaders 618 and 620 are, for example, rod lenses with a graded index of refraction such as those available from Melles Griot.

A second channel is provided in the first housing including optical fiber 622, beam spreader 624 and cuspate lens 602 coaxially aligned to send and/or receive light in an annulus 626 around the beam spreader 618. The corresponding second channel in the second housing 612 is similarly provided with cuspate lens 604, beam spreader 628 and optical fiber 630. If desired, additional channels can be provided by using cuspate lenses, eccentric lenses or axicons, which are progressively larger in diameter. Light losses resulting from the fiber optic(s) passing from outside the housings through the transmission annulus of the second channel (and any additional channels) are minimal.

The foregoing description is illustrative only, and various changes from the exemplary embodiments will occur to those in the art. It is intended that all such variations within the scope and spirit of the appended claims be embraced thereby.

We claim:
1. An optical fiber coupler, comprising:
  means for receiving a transmissive end of a first optical fiber;
  means for receiving transmissive ends of a plurality of second optical fibers in circular arrangement and defining a ring with a radial width substantially equal to a transverse dimension of said second optical fibers; and
  means for producing an annular beam, including a refractive device capable of conservatively transmitting substantially all light emitted from said end of said first optical fiber in an annular beam onto said ring.

2. An optical fiber coupler, comprising:
  means for receiving a transmissive end of a first optical fiber;
  means for receiving transmissive ends of a plurality of second optical fibers in circular arrangement and defining a ring with a radial width substantially equal to a transverse dimension of said second optical fibers; and
  means for producing an annular beam, including means for spreading light transmitted from said end of said first fiber into a beam of enlarged cross-section of light oriented parallel with respect to a reference axis, and including a refractive device which has a front surface extending radially from said axis to a periphery substantially equal to a cross-section of said beam to receive said beam, said front surface being radially symmetric with respect to said axis, said refractive device refracting and focusing substantially all of said light conservatively in an annular beam onto said ring.

3. The coupler of claim 2 wherein said spreading means comprises a pair of biconvex lenses.

4. The coupler of claim 2 wherein said spreading means comprises a device with a refractive index gradient.

5. The coupler of claim 2, wherein:
  said first optical fiber receiving means, said spreading means and said refractive device are mounted in a first housing;
  said second optical fiber receiving means is mounted in a second housing; and said first and second housings are rotatable with respect to each other about said axis.

6. An optical fiber coupler, comprising:

means for receiving a transmissive end of a first optical fiber;

means for receiving transmissive ends of a plurality of second optical fibers in circular arrangement and defining a ring with a radial width substantially equal to a transverse dimension of said second optical fibers; and means for producing an annular beam, including a cuspate lens and a means for spreading light transmitted from said end of said first fiber into a beam of enlarged cross-section of light oriented parallel with respect to a reference axis;

wherein said lens has a front surface extending radially from said axis to a periphery substantially equal to a cross-section of said beam to receive said beam, said front surface being radially symmetric with respect to said axis and having a cusp and a maximum slope magnitude at said axis, and having a decreasing slope magnitude from said cusp to said periphery for refracting said beam of light away from said axis, and a rear surface for transmitting said refracted light from said lens, said lens focusing substantially all of said refracted light conservatively into said ring.

7. The coupler of claim 6, wherein said spreading means comprises a pair of biconvex lenses.

8. The coupler of claim 6, wherein said spreading means comprises a device with a refractive index gradient.

9. The coupler of claim 6, wherein:

said first optical fiber receiving means, said spreading means and said lens are mounted in a first housing;

said second optical fiber receiving means is mounted in a second housing; and said first and second housings are rotatable with respect to each other about said axis.

10. An optical fiber coupler, comprising:

means for receiving a transmissive end of a first optical fiber;

means for receiving transmissive ends of a plurality of second optical fibers in circular arrangement and defining a ring with a radial width substantially equal to a transverse dimension of said second optical fibers; and means for producing an annular beam, including a cuspate lens capable of conservatively transmitting substantially all light emitted from said end of said first optical fiber in an annular beam onto said ring.

11. An optical fiber coupler, comprising:

means for receiving a transmissive end of a first optical fiber;

means for receiving transmissive ends of a plurality of second optical fibers in circular arrangement and defining a ring with a radial width substantially equal to a transverse dimension of said second optical fibers; and means for producing an annular beam, including an eccentric lens capable of conservatively transmitting all light emitted from said end of said first optical fiber in an annular beam onto said ring.

12. An optical fiber coupler, comprising:

means for receiving a transmissive end of a first optical fiber;

means for receiving transmissive ends of a plurality of second optical fibers in circular arrangement and defining a ring with a radial width substantially equal to a transverse dimension of said second optical fibers; and means for producing an annular beam, including an axicon capable of conservatively transmitting substantially all light emitted from said end of said first optical fiber in an annular beam onto said ring.

* * * * *